Patented Dec. 19, 1939

2,184,147

UNITED STATES PATENT OFFICE 2,184,147

MOTHPROOFING PROCESS AND MOTH-PROOFED MATERIAL

Wilfrid Lowe, Hayfield, near Stockport, England

No Drawing. Application March 27, 1934, Serial No. 717,683. Renewed March 18, 1939. In Great Britain March 30, 1933

10 Claims. (Cl. 21—5)

Clothes and furs are still protected against moths by treating them with substances having a penetrating odour such as paradichlorbenzene, naphthalene, camphor, etc.

These bodies are only useful whilst the materials remain in an atmosphere of these bodies.

Other organic chemical compounds are effectively employed which are expensive and are easily decomposed from their solutions or can be removed from materials treated with these complex compounds. They also offer difficulty in their practical application to animal fibres, such as cow hair from which the fatty constituents and the like have not been extracted, or the said compounds must be only used in acid solution, not being absorbed and retained by the animal fibres when a neutral or alkaline solution is employed, so that they are efficacious only with considerable care and attention in their application and use to animal fibres.

I have discovered a new, valuable, simple and cheap process to permanently protect from attack by moth larvae all animal fibres such as wool, hair, skins, furs, feathers, natural silk and like materials liable to attack and spoilation by moth larvae, and whilst the essential point is as above, yet the process is a protection against fungal rotting through infection by the spores of such fungi.

According to this invention animal fibres such as cow hair are steeped in a solution of chromium fluoride of determined strength in a suitable receptacle for a period of twenty minutes at a temperature of 180° Fahr. The excess liquor is then removed by the usual means and the hair is dried at a temperature of 155° Fahr. Alternatively woolen and felted materials are treated on a padding machine, being passed at full width through a solution of chromium fluoride of determined strength at a temperature of 80° Fahr., and are then passed between two suitable rollers, the pressure on which is so arranged, that 12 lbs. of woolen cloth or felted material will retain 1 gallon of the aforesaid solution after passing between the two squeezing rollers.

The squeezed or expressed woolen material is then dried in a hot air chamber or on a tentering machine at a temperature of 155° Fahr. The drying temperature should never fall below 150° Fahr. in order to obtain complete fixation of the chromium compounds in the fibre. When animal fibres are treated by either of the two methods herein described, they are rendered immune from attack by moth larvae, the reason being that the chromium compounds have combined with the constituents of the animal fibre forming toxic indigestible compounds which fact has been proved by my researches in the laboratory, for if moth larvae attack materials so treated they die immediately. It also protects them from moulds and other rotting agencies.

Woolen materials treated by my process have no harmful effect on the human skin.

All untreated animal fibres are attacked by moth larvae on account of their containing keratin, this being necessary for their development, notably the common clothes moth, *Tineola bisel-liella*.

The present process can be employed on raw unscoured animal fibres, or on scoured and dyed woolen and felted materials which are not deteriorated by the treatment, and in all cases the fibre is completely protected from attack by moth larvae. In working my process, I am mindful of the fact that the moth itself does not harm the fibres by eating them, as so-called clothes moths have no mouth organs, but I am mindful of the larvae produced from the eggs which the female moth deposits on the fibres. In using the word fibre, I distinctly refer to all fibres of animal origin.

The invention is illustrated by the following examples, the parts being by weight:

*Ex. 1.*—100 parts of cow hair are placed in a receptacle containing water at 180° Fahr. in which 3 parts of chromium fluoride have been dissolved, just sufficient water being employed to cover the materials to be treated. The hair is agitated or stirred for a period of 20 minutes to ensure complete saturation. It is then removed from the solution, allowed to drain, and it is then hydro-extracted and dried in a hot air chamber at 155° Fahr.

*Ex. 2.*—Woolen or felted material is passed at full width through a wooden box fitted with suitable rollers to guide and to keep at full width the aforesaid materials. This padding box or machine contains a solution of chromium fluoride, 1¼ parts of this product being dissolved in every 160 parts of water contained in the padding box. On issuing from this machine, the thoroughly saturated woolen or felted material passes between 2 squeezing rollers, the pressure on which is so arranged that 12 parts by weight of material retain 10 parts by weight of the aforementioned solution.

The treated and expressed material is then dried in a hot air chamber or on a tentering machine at a temperature of 155° Fahr. After being completely dried, the treated material contains 0.65% per cent of the chromium compounds permanently fixed in the fibres, which are in this way rendered immune from attack by moth larvae, mould and bacteria.

It is known that chromium oxides are valuable mordants for dyestuffs and in some small measure such combinations do act as deterrents to the larvae of moths, but I have found that the amount of chromium requires to be greater than that necessary for mordanting, and I have found as the result of my researches, that if the equivalent of 0.65% of chromium fluoride is introduced into the fibre by the methods and in the manner now divulged by me, that there will be fixed in the fibres, partly combined with the constituents of the fibre, basic chromium compounds, free oxides and fluorides, which will render such fibres proof against spoilation by the moth larvae which freely feed on fibres not so treated.

Naphthalene and all compounds which depend on their smell for deterring the moth from approaching the fibre, to deposit their eggs amongst the fibre, are only of value so long as such obnoxious smells are overbearing to the moth. Such smells are objectionable to most people, who would prefer to have the fibre impregnated with, something which would not smell, and which would retain its potency towards larvae after a number of washings, and my process and method supplies this great need. Successive washings with cold water, and water up to 160° Fahr. remove practically none of the deposited chromium compounds from the treated fibres.

Three hours continuous boiling with town's water 4° hardness removes $\frac{1}{10}$% (one tenth per cent) of the deposited salts from the fibre so treated. The salts change from acid to basic compounds and finally to hydroxides and free hydrofluoric acid is found in the solution. The quality of animal fibre and quality of water affects the result in some degree, as hard waters remove less of the deposited salts than soft waters. No claim of any kind is made for the use of the said product, for any purpose or process, other than the protection of animal fibres from attack and spoilation by moth larvae, moulds and other rotting agencies.

Having now particularly described and ascertained the nature of my said invention and in what manner the same is to be performed, I declare that what I claim is:

1. Processes for protecting animal fibres, wool, felt, furs, skins, feathers or the like from moth larvae which consists in immersing the material to be treated in a warm solution varying in degree, depending upon the material treated, of chromium fluoride approximating in strength one part of chromium fluoride to 125 parts of water, thereafter effecting hydro-extraction as by squeezing and submitting the same to air drying at a temperature not less than 150 degrees Fahrenheit.

2. Processes for protecting animal fibre, wool, felt, furs, skins, feathers or the like from moth larvae, which consists in immersing the material to be treated in a warm solution varying in degree, depending upon the material treated, of chromium fluoride approximating in strength three parts of chromium fluoride to one hundred parts by weight of the material immersed in the water, thereafter effecting hydro-extraction by squeezing or draining and submitting the same to air drying at a temperature not less than 150 degrees Fahr.

3. The process for protecting woolen and felted materials from attack by insect larvae, consisting of impregnating the material with a solution of fluoride of chrome of a predetermined strength at a temperature of approximately 80 degrees Fahrenheit in a padding machine, thereafter squeezing the material with the solution in a manner and to the extent that the impregnated woolen or felted material retains in the order of one gallon of the solution for twelve pounds of the treated material, thereupon drying the treated material at a temperature of not less than 150 degrees Fahrenheit, whereby from the predetermined strength of the solution there is retained combined in the fibre of the material treated a quantity of chromium compounds equivalent to approximately 0.65 per cent of chromium fluoride.

4. A process for protecting animal fibre such as cow hair, horse hair and the like from attack by moth larvae, consisting of impregnating the mass of the material with a solution of fluoride of chrome of a predetermined strength by immersion in the solution at a temperature of approximately 180 degrees Fahrenheit, for a period of approximately twenty minutes, draining or hydro-extracting, and thereupon at a temperature of approximately 155 degrees Fahrenheit drying the material treated, whereby in view of the predetermined strength of the solution a quantity of chromium compounds remains permanently combined with the keratin in the fibre of the material treated equivalent to approximately 0.65 per cent of chromium fluoride.

5. The process of treating woolen or felted materials for the purpose herein set forth, consisting of thoroughly saturating the material with a solution of approximately one part of chromium fluoride to 125 parts of water, thereafter passing the material through squeezing rollers and drying at approximately 155 degrees Fahrenheit, but not less than 150 degrees Fahrenheit, whereby chromium oxides are caused to be retained permanently in combination with the keratin of the fibre of the material treated in a form or forms making their retention in the fibre not subject to removal by water, hydro-carbons or the like.

6. The process for treating cow hair, horse hair or the like, for the purpose herein set forth, consisting of immersing the same in a solution of approximately 180 degrees Fahrenheit, consisting of approximately three parts of chromium fluoride dissolved in water sufficient to cover the materials treated for every one hundred pounds of material, agitating the material in the solution for approximately twenty minutes to assure complete saturation, thereupon draining the surplus solution from the material and finally drying the same in a hot air chamber at above 150 degree Fahrenheit.

7. The process of fixation of chromium oxide and hydroxides with keratin in animal fibre, consisting of saturating the animal fibre with a predetermined strength of solution of chromium fluoride, padding or pressing the material being treated to retain therein a predetermined amount of the solution, and thereafter drying the material being treated at opproximately 155 degrees Fahr., forming thereby a compound non-toxic to humans in the fibre poisonous to the larvae or grubs of insects and substantially insoluble.

8. Materials containing animal fibre proof against destruction from larvae or grubs of insects, containing hydroxides and oxides derived from basic chromium fluoride, as a permanent fixation in the fibre and partly combined with the keratin of the fibre and of an amount in terms of the weight of the animal fibre of approximately 0.65 per cent of chromium fluoride equivalent.

9. A process for protecting animal fibre against rotting through infection by the spores of fungi involving the immersing of the material to be treated in a warm solution of chromium fluoride approximating in strength the order of one part of chromium fluoride to 125 parts of water, thereafter effecting dehydration by squeezing or draining and then submitting the material to air drying at a temperature not less than 150 degrees Fahr.

10. A process for protecting animal fibre from mould which consists in saturating the material with a solution of fluoride of chrome of a predetermined strength raised to a warm temperature, draining or dehydrating, and thereupon drying the material at a temperature of approximately 155 degrees Fahr., whereby in view of the predetermined strength of the solution a quantity of chromium compounds remains permanently combined with the keratin in the fibre equivalent to approximately 0.65 per cent of chromium fluoride.

WILFRID LOWE.